United States Patent
Popoff et al.

[15] 3,679,736
[45] July 25, 1972

[54] DINITROPHENYLCARBAMATES

[72] Inventors: Ivan C. Popoff, Ambler, Pa.; Kenneth I. H. Williams, Sterling Junction, Mass.

[73] Assignee: Pennwalt Corporation, Philadelphia, Pa.

[22] Filed: June 2, 1967

[21] Appl. No.: 643,054

[52] U.S. Cl. ...........................260/479 C, 71/70, 260/471 C, 260/479 R, 260/479 S, 260/613 R
[51] Int. Cl. .......................................................C07c 125/06
[58] Field of Search .................................260/479 C, 471 C

[56] References Cited

UNITED STATES PATENTS

| | | | |
|---|---|---|---|
| 3,458,639 | 7/1969 | Heiss et al. | 260/471 |
| 2,933,383 | 4/1960 | Lambrech | 260/479 |

FOREIGN PATENTS OR APPLICATIONS

| | | | |
|---|---|---|---|
| 982,235 | 2/1965 | Great Britain | 260/479 |
| 1,027,969 | 5/1966 | Great Britain | 260/479 |
| 1,042,203 | 9/1966 | Great Britain | 260/479 |

Primary Examiner—James A. Patten
Attorney—Robert G. Danehower

[57] ABSTRACT

Formulations containing compounds of the structure

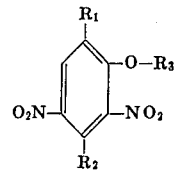

where $R_1$ is butyl, $R_2$ is H or lower alkyl, and $R_3$ is selected from the group consisting of

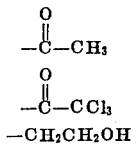

$-CH_2CH_2OH$ and

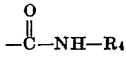

where $R_4$ is lower alkyl, and halogenated phenyl, and the use of these formulations as plant desiccants.

3 Claims, No Drawings

DINITROPHENYLCARBAMATES

This invention relates to formulated chemical compounds and their use as extremely fast desiccants. The formulations comprise a carrier and a compound of the structure

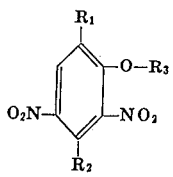

where $R_1$ is a butyl group (primary, secondary, or tertiary) $R_2$ is hydrogen or lower alkyl (from one to four carbon atoms) and $R_3$ is selected from the group consisting of acetyl, trichloroacetyl, hydroxyethyl and

where $R_4$ is lower alkyl, phenyl and halogenated phenyl, preferably chlorinated phenyl. These compounds where $R_3$ is trichloroacetyl, hydroxyethyl and

are novel compounds and are also an embodiment of the invention as is the process of desiccating plants with them.

The above described compounds are active desiccants and plants may be rapidly desiccated by applying to the foliage a desiccating amount of a compound of the above indicated structure.

In general, the desiccant will be applied to the foliage of plants by use of a carrier composition, containing one or more of the above compounds as the active agent. The amount of active agent which will be used will be those rates of application to the plant between about 0.05 and about 10 pounds per acre, although of course higher rates of application may be used and may be preferable for certain types of plants, particularly large woody plants such as trees.

The term desiccation as used in this discussion refers to desiccation without foliar drop, although of course there may be some foliar drop which occurs after desiccation has taken place, but in general desiccation of the plant will occur without loss of leaves.

It is understood that desiccation of plants and crops is of high economic importance in both agricultural and forestry operations, and particularly in agricultural application where desiccants are frequently used on seed crops to aid in harvesting.

The procedures that will be used to apply the active agents to trees, vegetables, plants and other crops for desiccation will be in accord with the usual practices. The compounds of the invention are water insoluble, but may be employed in aqueous dispersions, or alternatively they may be applied to crops from an organic solvent solution. An aromatic hydrocarbon oil such as xylene, toluene, paraffinic oils, and the like are useful solvents for the compounds of the invention, and, in fact, are a preferred medium for use in application to the plant.

The active agent may be made up as a concentrate which will be manufactured and sold as an article of commerce. Such a concentrate is simply diluted with water or solvent just prior to use either to form the aqueous dispersion, or the concentrate may be diluted with solvent to form a solution for spraying onto the foliage of the plant. The concentrate generally will contain from about 5 to about 50 percent by weight of the agent, the balance being the liquid vehicle and optionally a surfactant. Alternatively, the active agent may be placed on a solid carrier rather than in a liquid carrier and the solid carrier plus active agent be applied directly to the plant by dusting or it may be used in the form of wettable or dispersible powders which likewise may be added to aqueous systems for application by conventional techniques. Concentration of the active agent on a solid carrier will vary between about 2 and about 20 percent by weight of the total composition.

The compounds of the invention and their properties are illustrated by the following examples Example 1 — 2-sec-Butyl-4,6-dinitrophenyl Acetate.

To a solution of 30 g. (0.125 mole) of 2-sec-butyl-4,6-dinitrophenol and 13.9 g. (0.138 mole) of triethylamine in 200 ml. of benzene was added a solution of 10.8 g. (0.138 mole) of acetyl chloride in 50 ml. of benzene over a period of 20 minutes. The mixture was refluxed for 1 hr., cooled and filtered to give 17.5 g. of triethylamine hydrochloride. The filtrate was then washed with water, 5 percent aq. sodium carbonate, water, dilute hydrochloric acid, and water, dried over $MgSO_4$ and concentrated in vacuo to a viscous liquid. The liquid was heated for 1 hr. at 60° (0.5 mm.), leaving 31.5 g. of amber, viscous liquid (conversion 89 percent).

Analysis:

| Found | Calculated |
|---|---|
| %C 51.18 | 51.04 |
| %H 5.15 | 5.00 |
| %N 10.26 | 9.93 |

Example 2 — 6-tert-Butyl-2,4-dinitro-3-methylphenyl Acetate.

To a stirred solution of 25.4 g. (0.10 mole) of 6-tert-butyl-2,4-dinitro-3-methylphenol and 11.1 g. (0.11 mole) of triethylamine in 150 ml. of benzene was added a solution of 7.9 g. (0.10 mole) of acetyl chloride in 30 ml. of benzene over a 15 min. period. After refluxing the mixture for 3 hrs., the precipitated triethylamine hydrochloride was filtered off and the filtrate was concentrated in vacuo to a deep amber viscous residue. The crude product was dissolved in 200 ml. of hot hexane, Darco treated, and filtered hot. After standing overnight, there was obtained 24.7 g. (85 percent conversion) of product, m.p. 84°–86°. The analysis corresponded more closely to the starting phenol than the desired acetate ester, although the infrared spectrum showed a carbonyl band at 5.6 $\mu$ and no OH band. The product was then refluxed in excess acetic anhydride for 5 hrs., the excess acetic anhydride was stripped off in vacuo, and the residue was recrystallized from hexane to obtain 18.0 g. (61 percent conversion) of product, m.p. 86°–88°.

Analysis:

| Found | Calculated |
|---|---|
| %C 53.02 | 52.70 |
| %H 5.38 | 5.44 |
| %N 9.57 | 9.46 |

Example 3 — 2-sec-Butyl-4,6-dinitrophenyl Trichloroacetate.

To a solution of 30 g. (0.125 mole) of 2-sec-butyl-4,6-dinitrophenol in 200 ml. of benzene was added 13.8 g (0.137 mole) of triethylamine. To this was added a solution of 22.7 g. (0.125 mole) of trichloroacetyl chloride in 50 ml. of benzene over a period of 15 minutes during which time the temperature rose to 45°. The mixture was then stirred for 30 minutes while the temperature dropped to ambient temperature. Filtration gave 17.1 g. of $(C_2H_5)_3N \cdot HCl$. The filtrate was concentrated in vacuo, and the residue was kept at 40° (0.5 mm.) for 1 hr. There was obtained 44.2 g. (91 percent conversion) of amber-colored, viscous liquid product.

Analysis:

| Found | Calculated |
|---|---|
| %C 38.01 | 37.37 |
| %H 3.20 | 2.88 |
| %N 8.02 | 7.27 |

Example 4 — β-(2-sec-Butyl-4,6-dinitrophenoxy)ethanol.

A mixture of 200 g. (1.61 moles) of 2-bromoethanol and 52.4 g. (0.2 moles) of sodium 6-sec-butyl-2,4-dinitrophenoxide was heated at 110° for 24 hrs. After cooling, the reaction mixture was filtered and the filtrate evaporated in vacuo to yield a dark gummy residue. This residue was dissolved in ether and washed several times with equivalent amounts of water. The ether layer was then dried over $MgSO_4$, filtered and evaporated in vacuo to yield an oily residue. Distillation of the residue gave 19.5 g. (34 percent conversion) of a center cut fraction boiling at 144°–150° at 0.1 mm., $n_D^{25}$ 1.5698.

Analysis:

| Found | Calculated |
|---|---|
| %C 50.11 | 50.70 |
| %H 5.60 | 5.67 |
| %N 10.47 | 9.86 |

Example 5 — 2,4-Dinitro-3-methyl-6-tert-butylphenyl N-ethyl carbamate.

A solution of 15.9 g. (0.0627 mole) of 2,4-dinitro-3-methyl-6tert-butylphenol, 7.1 g. (0.1 mole) of ethylisocyanate and 5 drops of triethylamine in 25 ml. of benzene was refluxed for 2 hr. and then allowed to stand overnight at room temperature. Evaporation followed by recrystallization of the residue from hexane containing a small amount of benzene gave 13.0 g. (64 percent conversion) of almost colorless, slightly yellowish needles, m.p. 131°–135°. The m.p. was raised to 139°–141° by a second recrystallization and was unchanged after another recrystallization.

Analysis:

| Found | Calculated |
|---|---|
| %C 51.89 | 51.68 |
| %H 6.45 | 5.89 |
| %N 12.55 | 12.92 |

Example 6 — 2,4-Dinitro-3-methyl-6-tert-butylphenyl N-phenyl carbamate.

A solution of 14.6 g. (0.575 mole) of 6-tert-butyl-2,4-dinitro-3-methylphenol, 6.85 g. (0.575 mole) of phenyl isocyanate and 10 drops of triethylamine in 150 ml. of benzene was refluxed for 19¼ hr., then was evaporated to leave a yellow solid residue. Recrystallization from a cyclohexane-benzene mixture gave 16.2 g. of pale yellow plates with m.p. 116°–120° and 3.1 g. (second crop) which softened at 106° and melted at 108.5°–112° [total: 19.3 g. (90 percent conversion)]. The analytical sample was recrystallized from the same solvent mixture and melted at 126.5°–135°. The infrared spectrum in $CHCl_3$ solution of the material melting at 116°–120° was identical to that of the analytical sample.

Analysis:

| Found | Calculated |
|---|---|
| %C 57.96 | 58.10 |
| %H 5.74 | 5.14 |
| %N 11.10 | 11.30 |

Example 7 — 2,4-Dinitro-3-methyl-6-tert-butylphenyl N-3-chlorophenylcarbamate.

A solution of 7.7 g. (0.05 mole) of m-chlorophenylisocyanate and 12.7 g. (0.05 mole) of 2,4-dinitro-3-methyl-6-tert-butylphenol in 100 ml. of dry benzene containing 5 drops of triethylamine catalyst was refluxed for 3½ hr. and then evaporated to dryness under reduced pressure. The yellow solid residue was recrystallized from a mixture of benzene and cyclohexane to give 15.7 g. (77 percent yield) of product with m.p. 132°–133°.

Analysis:

| Found | Calculated |
|---|---|
| %C 53.58 | 53.01 |
| %H 4.60 | 4.45 |
| %N 9.96 | 10.30 |

EXAMPLE 8 – 2,4-Dinitro-3-methyl-6-tert-butylphenyl N-4-chlorophenylcarbamate.

A solution of 19 g. (0.075 mole) of 6-tert-butyl-2,4-dinitro-3-methylphenol, 11.5 g. (0.075 mole) of 4-chlorophenyl isocyanate and 10 drops of triethylamine in 150 ml. of benzene was refluxed for 20¾ hr. then was evaporated to leave a yellow solid residue, m.p. 129°–133°. Recrystallization from a benzene-cyclohexane mixture gave 24.8 g. of pale yellow plates with m.p. 138°–142° and 3.1 g. (second crop) which softened at 121° and melted at 127°–131°.[total: 27.9 g. (91 percent conversion)]. The analytical sample was recrystallized from the same solvent pair and had m.p. 146°–154°. The infrared spectrum of the material with m.p. 138°–142° in $CHCl_3$ solution was identical to that of the analytical sample.

Analysis:

| Found | Calculated |
|---|---|
| %C 53.00 | 53.01 |
| %H 4.73 | 4.45 |
| %N 10.04 | 10.30 |

Example 9 – 6-tert-Butyl-2,4-dinitro-3-methylphenyl N-(3,4-dichlorophenyl)-carbamate.

A mixture of 12.7 g. (0.05 mole) of 6-tert-butyl-2,4-dinitro-3-methylphenol and 9.4 g. (0.05 mole) of 3,4-dichlorophenyl isocyanate was warmed until it became homogeneous. To this mixture was added 0.5 ml. of triethylamine and an exothermic reaction resulted. After 15 min. the mixture began to cool with a dark amber colored glassy product bring obtained. The crude product was recrystallized from a hexane-benzene (10:1) mixture with Darco treatment to give 14.5 g. melting at 124°–127° and 2.7 g. melting at 120°–125° (total, 172 g. 77.5 percent conversion) of product.

Analysis:

| Found | Calculated |
|---|---|
| %C 49.25 | 48.88 |
| %H 4.03 | 3.88 |
| %Cl 16.40 | 16.04 |
| %N 9.49 | 9.50 |

The activity of the compounds is quite surprising in that they have a remarkably fast desiccating effect. In some cases desiccation is complete two hours after application and this may be achieved at rates of application as low as 1 pound per acre. This fast desiccation is, of course, extremely valuable in that it enables application and harvesting to be made in a short space of time, thus greatly improving the efficiency of harvesting operations.

The effects of the compounds of desiccants is illustrated by the following examples. Desiccant activity was determined by spraying various formulations of the agents on to the foliage of two week old Black Valentine bean plants at various rates of application and visibly observing the effects. The following Table I indicates the conditions used and the results obtained.

It will be understood that numerous variations and changes may be made from the above description and examples without departing from the spirit and scope of the invention.

TABLE I

Active agent:

$R_1$ at position 1, $O-R_3$ at position 2, $NO_2$ at position 3, $R_2$ at position 4, $O_2N$ at position 6 of benzene ring.

| $R_1$ | $R_2$ | $R_3$ | Formulation (percent by weight) | Percent desiccation |
|---|---|---|---|---|
| Sec-butyl | H | $-\overset{O}{\underset{\|}{C}}-CH_3$ | 5% active agent<br>90% xylene<br>5% surfactant ("Triton" X-155)<br>Dispersed in water | 100% in 1 day at 10 lbs./acre.<br>5 to 95% at 1 lb./acre. |
|  |  |  | 10% active agent<br>85% xylene<br>5% surfactant ("Triton" X-155)<br>Diluted with oil | 100% in 1 day at 1 lb./acre. |
| Tert-butyl | $CH_3$ | $-\overset{O}{\underset{\|}{C}}CH_3$ | 10% active agent<br>85% xylene<br>5% ("Triton" X-155)<br>Diluted with oil | 100% in 1 day at 1 lb./acre. |
| Sec-butyl | H | $-\overset{O}{\underset{\|}{C}}CCl_3$ | 10% active agent<br>85% xylene<br>5% "Triton" X-155 |  |
|  |  |  | Dispersion in water<br>Diluted with oil | 100% in 1 day at 1 lb./acre.<br>100% in 1 day at 1 lb./acre. |
| Sec-butyl | H | $-CH_2CH_2OH$ | 10% active agent<br>85% xylene<br>5% "Triton" X-155<br>Diluted with oil | 100% in 1 day at 1 lb./acre. |
| T-butyl | $CH_3$ | $-\overset{O}{\underset{\|}{C}}NHC_2H_5$ | 5% active agent<br>93% xylene<br>2% "Triton" X-155<br>Dispersed in water | 100% in 4 hours at 1 lb./acre. |
| T-butyl | $CH_3$ | $-\overset{O}{\underset{\|}{C}}NH-C_6H_5$ | 10% active agent<br>50% acetone<br>43% xylene<br>2% "Triton" X-155<br>Diluted with oil | 100% in 1 day at 1 lb./acre.<br>95 to 100% in 1 day at 0.1 lb./acre. |
|  |  |  | Dispersed in water | 75 to 100% in 1 day at 1 lb./acre. |
| T-butyl | $CH_3$ | 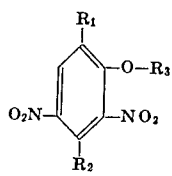 | 5% active agent<br>93% xylene<br>2% "Triton" X-155<br>Dispersed in water | 100% in 1 day at 0.1 lb./acre. |
|  |  |  | 5% active agent<br>45% acetone<br>48% xylene<br>2% "Triton" X-155<br>Diluted with oil | 100% in 1 day at 0.1 lb./acre. |
| T-butyl | $CH_3$ | $-\overset{O}{\underset{\|}{C}}NH-\text{C}_6H_4-Cl$ | 10% active agent<br>85% acetone<br>5% surfactant ("Triton" 20)<br>Diluted with oil | 100% in 1 day at 1 lb./acre. |
| T-butyl | $CH_3$ | 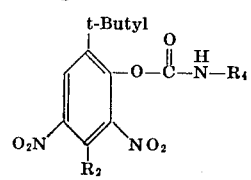 | 10% active agent<br>85% xylene<br>5% "Triton" X-155<br>Dispersed in water | 100% in 1 day at 1 lb./acre. |

WE CLAIM:

1. Compounds having the structure $R_1$ at position 1, $O-R_3$ at position 2, $NO_2$ at position 3, $R_2$ at position 4, $O_2N$ at position 6 of benzene ring.

where $R_1$ is tertiary butyl, $R_2$ is lower alkyl, and $R_3$ is $-C(O)NHR_4$, where $R_4$ is selected from the group consisting of lower alkyl, phenyl, monohalogenated phenyl and dihalogenated phenyl.

2. A compound having the structure t-Butyl at position 1, $-O-\overset{O}{\underset{\|}{C}}-\overset{H}{\underset{\|}{N}}-R_4$ at position 2, $NO_2$ at position 3, $R_2$ at position 4, $O_2N$ at position 6.

wherein $R_2$ is lower alkyl and $R_4$ is lower alkyl.

3. A compound as in claim 2 where $R_2$ is methyl and $R_4$ is $C_2H_5$.

* * * * *